United States Patent

Atiya

Patent Number: 5,224,088
Date of Patent: Jun. 29, 1993

[54] HIGH RESOLUTION OPTICAL SCANNER

[75] Inventor: Yossef Atiya, Vancouver, Canada

[73] Assignee: Creo Products Inc., Burnaby, Canada

[21] Appl. No.: 833,215

[22] Filed: Feb. 10, 1992

[51] Int. Cl.$^5$ .............................................. G11B 7/00
[52] U.S. Cl. .................................. 369/97; 369/44.18; 369/44.19; 235/454; 359/225
[58] Field of Search .......................... 346/76 L, 135.1; 369/44.18, 44.19, 97; 235/454; 359/210, 223–225; 358/345, 347, 348; 267/160

[56] References Cited

U.S. PATENT DOCUMENTS

| | | | |
|---|---|---|---|
| 4,301,374 | 11/1981 | Hashiue | 369/97 X |
| 4,322,063 | 3/1982 | Fischbeck et al. | 267/160 |
| 4,567,585 | 1/1986 | Gelbart | 369/97 |

Primary Examiner—W. R. Young

[57] ABSTRACT

A simple high resolution optical scanner consists of high numerical aperture lens mounted at the end of a flexible cantilever. The lens scans along a curved line as the cantilever bends. In order for the optical path to track the lens position, a mirror is mounted on the cantilever at a point located about 20% of the cantilever length, measured from the fixed mounting point. As the cantilever bends, the angle at this point is half of the angle at the cantilever end. Since the mirror doubles this angle when reflecting the input beam, the input beam will track, and stay parallel to, the lens at the end of the cantilever. This type of scanner is particularly suited to operate in a resonant mode, since the cantilever shape has low inherent damping.

6 Claims, 1 Drawing Sheet

HIGH RESOLUTION OPTICAL SCANNER

BACKGROUND OF THE INVENTION

The inventions relates to optical scanning and more specifically to low cost optical scanners.

It is well known that resonant optical scanners are simple and economical. In order to achieve high resolution, these scanners have to be of the moving lens type, since other types can not achieve the high numerical aperture required for high resolution. In a moving lens scanner, the incoming light beam has to stay centered on the moving lens. This requirement limited most of these scanners to the linear type. Examples of such scanners are U.S. Pat. No. 4,567,585 and 4,322,063. A cantilever type scanner, flexing at its resonant frequency, is one of the simplest forms of scanners. Its curved scan line however, causes special difficulty in tracking the moving lens with the incoming light beam.

SUMMARY OF THE INVENTION

It is an object of this invention to provide a simple way of causing the incoming beam to track the moving lens mounted at the free end of the cantilever scanner. Another object is to provide a very simple and economical scanner capable of high scan velocities. This type of scanner is of particular interest in the optical data storage industry. In accordance with the current invention a mirror is rigidly connecting to the cantilever beam at a distance approximately 20% of the beam length, measured from the fixed end. This mirror reflects the incoming beam and directs it towards the free end of the cantilever. As the cantilever bends the mirror changes its angle, keeping the incoming beam centered on the moving lens.

BRIEF DESCRIPTION OF THE DRAWINGS

This invention is described in detail below references to the drawings in which.

DESCRIPTION OF THE PREFERRED EMBODIMENTS

Figure 1:
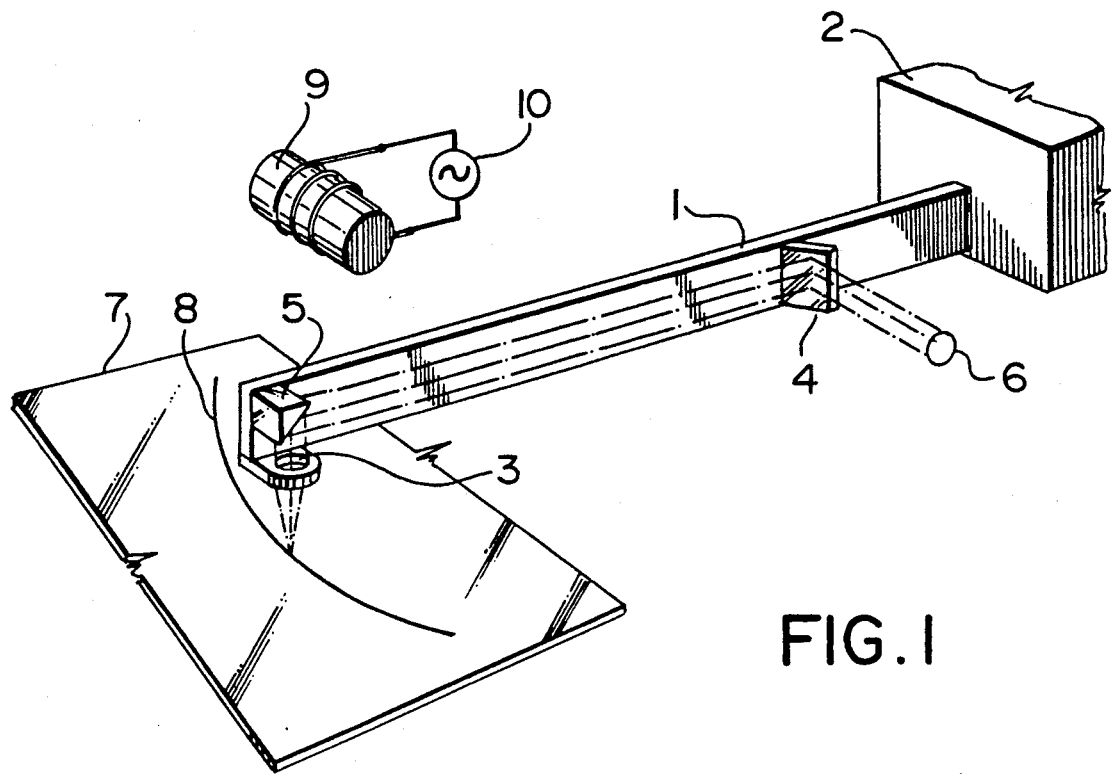
FIG. 1 is a general view of the present invention.

Referring now to FIG. 1, a flexible cantilever 1 is rigidly attached to a stationary support 2. Cantilever 1 carries a lens 3, mounted parallel to the material being scanned 7. A mirror 4 rigidly mounted to the cantilever at a point about 20% of its length as measured from the fixed end of the cantilever. The incoming light beam 6 is reflected by mirror 4 towards the free end of the cantilever. A second mirror 5 deflects the light beam towards lens 3, which in turn focuses it on material 7. As the cantilever bends the focused light follows a curved scan line 8 on the surface of material 7. By the way of example, material 7 can be optical data storage tape or an optical memory card. The scanner can be used as its resonant frequency by making beam 1 from a ferromagnetic material and using electromagnetic 9 to excite beam 1 into resonance. When electromagnet 9 is driven from an alternating current source 10 having a frequency of exactly one half of the resonant frequency of the cantilever, the cantilever will resonate and very low power will be required to keep it scanning.

Figure 2:
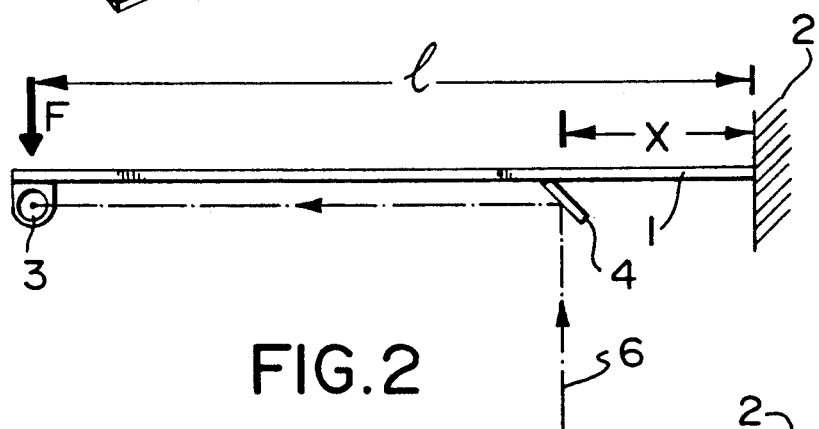
FIG. 2 is a schematic view showing the principle of operation when beam is undeflected.
Figure 3:
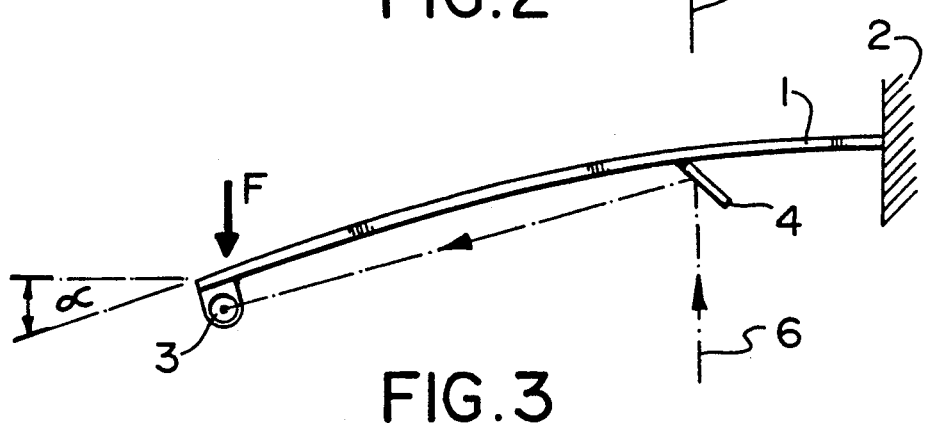
FIG. 3 is a schematic view showing the principle of operation when beam is deflected.

Referring now to FIG. 2 and FIG. 3, the principle of operation can be seen from the equation controlling the deflection of a cantilever:

deflection at a point $x = F/2EI(lx^2 - x^3/3)$ x is the distance from the fixed point and varies from 0 to l.

F is the force acting at the free end.

E is the Modulus of Elasticity of the material.

I is the moment of inertia of the cross-section of the cantilever.

The exact selection of mounting point of mirror 4 depends on the following factors:

a. The exact place force F acts on the cantilever.

b. Deviation from this equation due to dynamic effects and nonuniform mass distribution.

c. The exact optical requirements of the tracking.

By way of example the distance x will be found for which the incoming beams stays parallel to the free end of the cantilever. To stay parallel mirror 4 has to deflect exactly half of the slope at the cantilever end, since the mirror will double his angle. The slope angle of the cantilever can be found from the deflection equation:

$$\text{slope} = d/dx[F/2EI(lx^2 - x^3/3)] = F/2EI(2lx - x^2)$$

For the slope change of mirror 4 to equal half the slope at cantilever end:

$$\tfrac{1}{2} \cdot F/2EI(2l \cdot l - l^2) = F/2EI(2lx \cdot x^2)$$

solving for x, $x = l(1 - \sqrt{2}/2) \approx 0.29289\, l$

A different x can be found using a similar method of calculation for different constraints, for example zero movement of the beam across the lens. It is understood that all these calculations are approximate since the beam equation used is an approximation, however the approximation is fairly accurate for relative large deflections of up to 10% of l. In general different constraints do not change the position of mirror 4 by a significant amount and the position is almost always found to be between 15% to 30% of l. By the way of example, if the requirement is tracking the center of the lens for a beam deflecting dynamically, the value for x is x = 19% of l. This point is chosen when the dynamic tracking is important, as the case is for resonant scanners.

By the way of example a scanner as shown in FIG. 1 having l = 100 mm can easily scan a line 8 having a length of 12 mm. Mirror 4 is mounted 19 mm from fixed end. Lens 3 is a moulded plastic aspheric lens of f = 4.5 mm and N.A. = 0.50. The scan frequency can reach 300 Hz. Since the lens in this example can easily resolve a one micron spot, each scan line will contain 12,000 spots and the data rate will be 2·300·12,000 = 7,200,000 spots per second (since the scanner scans the line twice during each cycle). Such a scanner is highly desirable in an optical card reader as well as optical tape recorders due to its low cost, simplicity and relative high data rate.

Should the vibration caused by the scanner be objectionable a balanced configuration, similar to a tuning fork, can be used.

What is claimed is:

1. An optical scanner comprising:
   a cantilever capable of flexing;
   a lens mounted at free end of said cantilever;
   a mirror rigidly mounted to said cantilever at a point closer to, but not at, the fixed end of said cantilever;

a fixed incoming light beam directed towards said mirror and being reflected by said mirror towards said lens, position of said mirror chosen to keep said light beam going through said lens over the useable flexing range of said cantilever.

2. An optical scanner as in claim 1 wherein a second mirror is mounted at free end of cantilever for directing said light beam into lens.

3. An optical scanner as in claim 1 wherein said mirror is mounted at a distance between 15% to 30% of cantilever length, said distance measured from the fixed end.

4. An optical scanner as in claim 1 driven at its natural resonant frequency by electromagnetic means.

5. An optical scanner as in claim 1 wherein the material being scanned is an optical memory card.

6. An optical scanner as in claim 1 wherein the material being scanned is optical tape.

* * * * *